April 17, 1962     S. MACOMBER     3,029,914
LAMINATED TUBULAR SECTION STRUCTURAL MEMBERS
Filed Nov. 25, 1958                                                            2 Sheets-Sheet 1
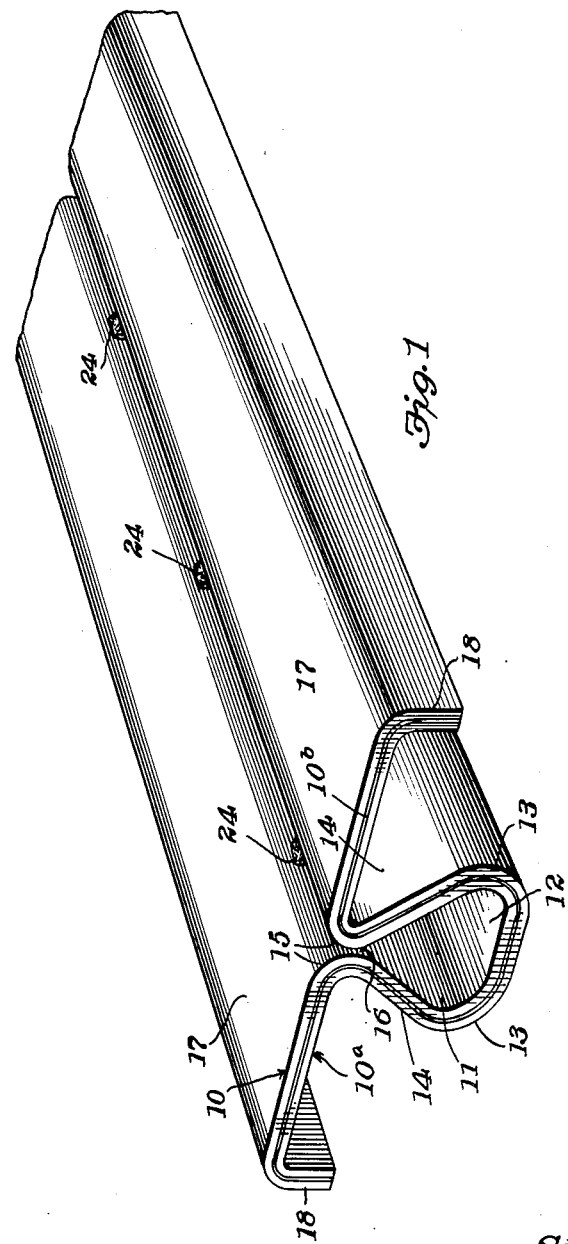
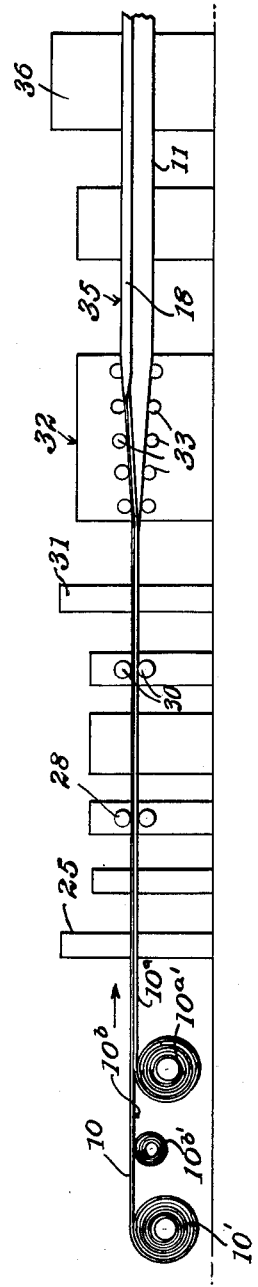
INVENTOR
*Stanley Macomber,*
BY *Frease & Bishop*
ATTORNEYS

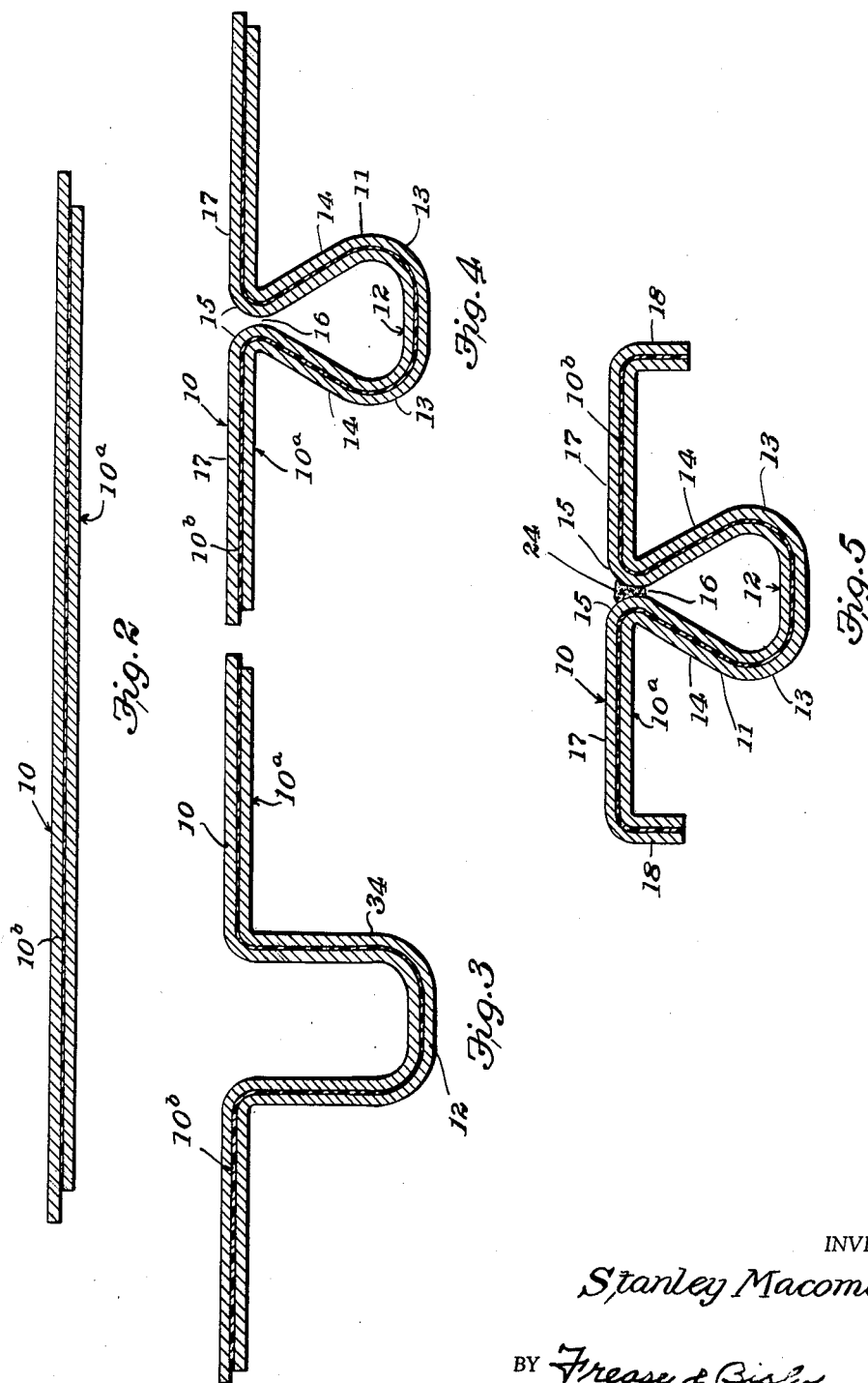

United States Patent Office 3,029,914
Patented Apr. 17, 1962

3,029,914
LAMINATED TUBULAR SECTION STRUCTURAL
MEMBERS
Stanley Macomber, Canton, Ohio, assignor to Macomber,
Incorporated, Canton, Ohio, a corporation of Ohio
Filed Nov. 25, 1958, Ser. No. 776,284
5 Claims. (Cl. 189—37)

The invention relates to laminated tubular section structural members formed of plural strips of steel, and this application is a continuation-in-part of my copending application, Serial No. 713,810, filed February 7, 1958.

Single ply tubular section structural members of the type referred to have been made for many years in accordance with my Patent No. 2,457,250, issued December 28, 1948. Such a structural member comprises an elongated strip of metal having its longitudinal central portion bent into a substantially triangular tubular "bulb," opposite edge portions of the strip being oppositely bent forming substantially flat flanges.

The dimensions of such structural members are limited by the gauge of the steel strips from which they are formed. For instance, permissible flange widths are limited to slightly over twenty times the gauge of the steel strip, and this requires that the terminal edges of the flanges be reinforced with downturned lips.

Originally, such tubular section structural members were made in gauges from 0.060" to a maximum gauge of 0.160", with a "bulb" of 1¼" height. Since a deeper bulb permits practical utilization of heavier gauge steel, a 3-inch deep section was later developed using a maximum gauge of 0.230". This is the heaviest gauge in the present hot rolled sheet classification, and also, for all practical purposes is the heaviest gauge sheet which may be coiled and uncoiled as is desirable in the manufacture of such structural members.

Thus, in the 3-inch deep "V-section" as compared with the original 1¼" section, applicant gained not only the additional area in the "bulb" as a result of increased depth and heavier gauge, but also gained a wider flange allowance due to the heavier gauge metal used in the fabrication thereof.

Such tubular, or "V-section," structural members are commonly utilized as chords in fabricated steel joists, beams, girders and other fabricated structural members in which spaced top and bottom chords are connected by an intervening open-web system. It will be evident that the capacity of such fabricated members is limited by the maximum dimensions, strength and capacity of the "V-sections" utilized as chords therein.

Therefore, these 3-inch deep "V-sections" are not suitable for use as chords in extremely long trusses, girders, beams, long-span joists and similar large heavy fabricated structural members.

In my copending application above referred to, the tubular section structural members are formed of plural strips of steel so as to be of sufficient capacity for use as chords in such large heavy fabricated structural members. The several laminations in said copending application are disclosed as attached together by spot-welding, or by punching and plugging.

This construction of laminated structural member necessitates an additional operation to spot weld the steel strips together at their longitudinal center lines, and further operations to spot-weld the flange portions and downturned terminal edges of the flanges of the several laminations together; or similar operations to punch and plug the strips together centrally and then to later punch and plug the flanges and terminal edge portions of the laminations together.

These operations require considerable additional time and labor, and add considerably to the cost of producing such laminated tubular section structural members.

Since filing my copending application, Serial No. 713,810, I have discovered that the cost of producing such laminated tubular section structural members may be considerably lessened, and the time required for forming the same may be considerably shortened, by omitting the spot-welding and/or the punching and plugging operations, and by connecting the several steel strips together by means of plastic adhesive applied prior to the forming operation.

There have recently been made available plastic adhesives which will securely join metal sheets or other metal articles together. These plastic adhesives may be obtained in various forms, such as a paste which may be spread upon the opposed surfaces of the metal articles to be joined together, a liquid which may be sprayed or otherwise applied to the opposed metal surfaces, and in the form of thin sheets of plastic adhesive material which may be placed between the metal sheets or the like to be joined together.

Some of these plastic adhesive materials will function to securely join the metal sheets or the like together merely by the application of pressure to the metal sheets with the plastic adhesive located therebetween, while others of these plastic adhesives require the application of both pressure and heat.

It is, therefore, an object of the invention to provide a tubular or "V-section" structural member formed of laminations of steel strip material securely joined together by a plastic adhesive, of sufficient capacity for use as chords in large heavy fabricated structural members such as trusses, girders and the like.

Another object of the invention is to provide such a laminated tubular section structural member which will permit doubling in structural effect the maximum gauge of hot-rolled steel strips or sheets available, by joining two superposed strips of up to 0.230" gauge with plastic adhesive, giving a combined overall gauge of up to 0.460".

A further object of the invention is to provide a laminated tubular section structural member of the character referred to in which the laminations are securely joined together by plastic adhesive located between opposed surfaces of the laminations.

A still further object of the invention is to provide a laminated tubular section structural member formed of plural steel sheets with a sheet of plastic adhesive material located therebetween and securely joining the steel sheets together.

The above objects together with others which will be apparent from the drawings and following description, or which may be later referred to, may be attained by constructing the improved laminated tubular section structural member in the manner hereinafter described in detail and illustrated in the accompanying drawings.

In general terms, the invention may be described as comprising a laminated tubular section structural member comprising two juxtaposed hot-rolled steel strips connected together by plastic adhesive material, the longitudinal central portion of the united strips being formed into substantially triangular tubular or "bulb" shape, with oppositely disposed flat flanges at the top of the "bulb" and terminating in downturned terminal edges.

A longitudinal nailing groove is formed at the top or apex of the triangular "bulb" and welds are located at spaced points therein to hold the groove to a predetermined definite width.

In forming the laminated tubular or "V-section" structural member, two hot-rolled steel strips are superposed, with a plastic adhesive material therebetween to securely join the steel strips together.

Such plastic adhesive materials may be obtained in several forms, such as a paste which may be squeezed from a soft metal foil tube or the like and spread upon one or both of the opposed surfaces of the steel strips, or liquid which may be sprayed upon one or both of said opposed surfaces, or a thin plastic adhesive strip which may be placed between the superposed steel strips.

The two superposed, connected steel strips are then passed longitudinally through forming rolls which form the longitudinal central portion thereof into a substantially triangular "bulb," with a longitudinal groove at its top or apex, and the edge portions are bent oppositely to form oppositely disposed flat flanges with downturned terminal edges.

The several laminations of sheet steel forming the completed tubular or "V-section" structural member are securely joined together by the plastic adhesive material located therebetween. The pressure applied to the steel laminations by the forming rolls is sufficient to "set" certain of said plastic adhesive materials.

Others of said plastic adhesive materials require the application of heat as well as pressure to cause the same to "set." As some heat is generated by friction during the forming operation, this heat is sufficient to "set" some of these plastic adhesive materials. If higher temperatures are required to "set" any of these plastic adhesives, additional heat may be applied in any suitable manner to the steel strips as they pass through the forming rolls.

Having thus briefly described the laminated tubular section structural member to which the invention pertains, reference is now made to the accompanying drawings, in which;

FIG. 1 is a perspective view of a portion of a laminated tubular section structural member embodying the invention;

FIG. 2 is a transverse sectional view through two superposed hot-rolled steel strips with a plastic adhesive material therebetween, preparatory to being formed into the laminated structural member to which the invention pertains;

FIG. 3 is a transverse sectional view through the superposed connected steel strips after an initial forming operation;

FIG. 4 is a similar view after the triangular tubular "bulb" has been formed;

FIG. 5 is a transverse sectional view through the completed laminated tubular section structural member; and, FIG. 6 is a diagrammatic view showing the manner in which the laminated tubular section structural member is formed.

Referring now more particularly to the embodiment of the invention illustrated in which similar reference characters refer to like parts throughout, the laminated tubular section structural member to which the invention pertains, as best shown in FIGS. 1 to 5 inclusive, is formed of two hot-rolled steel strips, the combined thickness of which may be between 0.230 inch and 0.460 inch.

Either one, or both, of the steep strips forming the laminated tubular section structural member may be of a maximum gauge of 0.230 inch. The two hot-rolled steel strips forming the laminated tubular section structural member are indicated generally at 10 and 10a.

The longitudinal central portion of the laminated structural member is formed into a substantially triangular tubular portion or "bulb" indicated at 11. This "bulb" or tubular portion comprises the flat bottom wall 12, connected through the curved bends 13 at each side with the upwardly converging, substantially flat side walls 14 having the spaced, oppositely curved, rounded bends 15 at the apex of the triangle, forming a longitudinal slot or groove 16 at the top of the structural member.

The laminated strips are then bent outwardly in opposite directions from the slot 16, forming the oppositely disposed, lateral, flat flanges 17, which are located in a plane parallel with the flat bottom wall 12 of the "bulb."

The terminal edges of the flanges 17 are bent downwardly, preferably at 90° angles, as indicated at 18, to stiffen and reinforce the laminated structural member.

The two steel strips 10 and 10a are securely joined together by an interposed film of plastic adhesive material, indicated at 10b. This plastic adhesive material is now available upon the market under several different names, produced and sold by several manufacturers, and is of such composition that it will securely join metal articles together upon the application of pressure, and in some cases the additional application of heat.

Such plastic adhesive materials may be obtained in various forms, such as a paste dispensed in collapsible tubes or the like, a liquid which may be sprayed or otherwise applied to the opposed surfaces of metal articles to be joined, and in the form of thin sheets or strips adapted to be placed between metal articles to be joined.

Regardless of which form of plastic adhesive is used, the steel strips 10 and 10a are quickly and readily joined securely together with a considerable saving in time, labor and expense, as compared with welding or punching and plugging in the manner disclosed in my copending application, Serial No. 713,810.

For the purpose of holding the width of the slot or groove 16 to a definite spacing, as well as to assist in stiffening and reinforcing the laminated structural member, and holding it rigidly in the formed condition, welds as indicated at 24 may be located at spaced intervals in the entrance to the slot or groove 16.

In such a laminated tubular section structural member, owing to the increased thickness of the combined strips 10 and 10a of which the structural member is formed, the bulb 11 of the structural member may be of considerably greater depth than is possible under present practice.

The flange width may also be considerably increased over present practice and may be slightly over 20 times the combined gauge of the two strips 10 and 10a. The structural effect and capacity of such a laminated tubular section structural member may thus be greatly increased over present practice, wherein the structural members are formed of a single hot rolled strip with a maximum gauge of 0.230 inch.

By using two hot rolled strips 10 and 10a, each of the maximum gauge of 0.230 inch, an overall gauge of 0.460 inch is provided which would permit doubling in structural effect the maximum gauge of hot rolled sheet available.

Thus, large heavy tubular section structural members may be produced which will be suitable for use as chord members in large heavy fabricated structural members for carrying extremely heavy loads, such as trusses, girders, beams, long-span joists and the like.

In FIG. 6 is shown diagrammatically the manner in which a laminated tubular section structural member may be formed from two hot-rolled steel strips, joined together by plastic adhesive in the form of a strip of plastic adhesive sheet material which is introduced between the steel strips as the same are fed into the forming apparatus.

It should be understood that in the event the plastic adhesive is in paste form, the same may be fed upon one or both opposed surfaces of the steel strips as they are uncoiled and passed into the forming apparatus. This plastic adhesive paste may be spread entirely over said opposed surface or surfaces of the steel strips, or may be fed thereon in longitudinal stripes or bands.

It should also be understood that if liquid plastic adhesive material is used, the same may be sprayed or otherwise applied to one or both opposed surfaces of the steel strips as they are uncoiled and passed into the forming apparatus.

Coils of hot rolled strips as indicated at 10' and 10a' are located in suitable coil boxes at the charging end of the forming apparatus, with a coil of plastic adhesive sheet material located therebetween, as indicated at 10b' in FIG. 6. The steel strips 10 and 10a and the plastic adhesive strip 10b are withdrawn from the coils 10', 10a' and 10b' respectively, and are placed in superposed position with the plastic adhesive strip 10b located between the steel strips 10 and 10a.

In this relative position, the steel strips 10 and 10a, with the plastic adhesive strip 10b located therebetween, are passed through the side guides, indicated generally at 25, then between the power rolls 28 and 30 which advance the superposed strips through the side guides 31 and then into the forming mill indicated generally at 32.

This forming mill includes a plurality of forming rolls indicated diagrammatically at 33, which form the superposed steel strips 10 and 10a, with plastic adhesive film 10b therebetween, progressively as shown in FIGS. 3, 4 and 5.

First, the longitudinal central portion of the combined strips is formed into substantially U-shape, as indicated at 34 in FIG. 3, after which the upper ends of the U are bent toward each other forming the substantially triangular bulb 11, as shown in FIG. 4. The terminal edges of the combined strips are then bent down forming the terminal flanges 18, as shown in FIG. 5.

The formed laminated tubular section structural member, as indicated generally at 35 in FIG. 6, then passes through the sliding cut-off shear indicated generally at 36, where it may be cut into sections of any desired length and is ready for use as chords in trusses, girders or other large, heavy fabricated structural members.

It has been found by actual practice that such a laminated tubular section structural member of any given total gauge may be roll formed with much less power than a single-ply structural member of the same given gauge.

Therefore, while the laminated structural member was developed in order to produce larger and heavier structural members than the single-ply structural members of present practice, the invention is not limited to such large, heavy structural members, but includes the laminated structural members formed from a plurality of sheets of gauges in the hot rolled sheet classification, regardless of the combined thickness of the laminations.

Thus, while for the purpose of illustration, the structural member is shown as formed of only two hot-rolled sheets, it should be understood that the laminated structural member may be formed from two or more hot-rolled sheets.

From the above it will be seen that the laminated tubular section structural member constructed in the manner herein disclosed may be of greatly increased capacity. Such laminated structural members may be of considerably greater depth than is possible under present practice where such members are formed from a single thickness of hot-rolled strip, and the flange width may greatly exceed the maximum flange width under present practice.

It will also be evident that these laminated structural members are formed of hot-rolled strips which may be coiled and uncoiled as is necessary and desirable in the manufacture of such products.

It will also be seen that the laminated structural member may be formed to desired shape with considerably less power than would be required in the bending and forming of a single-ply steel plate of a gauge equal to the combined thicknesses of the two steel strips from which the laminated structural member is formed.

Laminated structural members made in this manner would be suitable for use as chords in heavy trusses, girders, beams and long-span joists for which purposes the single-ply V-sections of present practice cannot be used. This is possible because the laminated structural member permits doubling in structural effect the maximum gauge of hot rolled steel sheet available.

It will also be evident that this laminated structural member functions without slippage between the two strips of which it is formed when submitted to maximum moment stresses under loading of built-up truss members or the like in which the laminated structural members form the chords.

In the foregoing description, certain terms have been used for brevity, clearness and understanding, but no unnecessary limitations are to be implied therefrom beyond the requirements of the prior art, because such words are used for descriptive purposes herein and are intended to be broadly constructed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A laminated tubular section structural member of indefinite length and uniform cross-section for use as a chord member in a large, heavy fabricated structural member, said laminated tubular structural member comprising two superposed hot-rolled steel sheets, the opposed surfaces of which are in contact throughout their entire areas, a plastic adhesive material located between and securely connecting said superposed steel sheets together throughout their areas providing a composite hot-rolled steel sheet, the longitudinal central portion of said composite steel sheet being of tubular form with a longitudinal groove in one side thereof, the sides of the tubular form converging toward said groove and the edge portions of said composite steel sheet being oppositely disposed on each side of the groove forming flat flanges, and downturned perpendicular terminal portions thereon, whereby the two sheets are interlocked, and welds at spaced points in the entrance to the groove for rigidly holding the two sheets interlocked.

2. A laminated tubular section structural member of indefinite length and uniform cross-section for use as a chord member in a large, heavy fabricated structural member, said laminated tubular structural member comprising two superposed hot-rolled steel sheets, the opposed surfaces of which are in contact throughout their entire areas, the thickness of each of said steel sheets being no greater than .230 inch, the heaviest gauge in the present hot-rolled sheet classification, a plastic adhesive material located between and securely connecting said superposed steel sheets together throughout their areas providing a composite hot-rolled steel sheet, the longitudinal central portion of said composite steel sheet being of tubular form with a longitudinal groove in one side thereof, the sides of the tubular form converging toward said groove and the edge portions of said composite steel sheet being oppositely disposed on each side of the groove forming flat flanges, and downturned perpendicular terminal portions thereon, whereby the two sheets are interlocked, and welds at spaced points in the entrance to the groove for rigidly holding the two sheets interlocked.

3. A laminated tubular section structural member of indefinite length and uniform cross-section for use as a chord member in a large, heavy fabricated structural member, said laminated tubular structural member comprising two superposed hot-rolled steel sheets, the opposed surfaces of which are in contact throughout their entire areas, the combined thickness of said superposed steel sheets being greater than .230 inch, the heaviest gauge in the present hot-rolled sheet classification, a plastic adhesive material located between and securely connecting said superposed steel sheets together throughout their areas providing a composite hot-rolled steel sheet, the longitudinal central portion of said composite steel sheet being of tubular form with a longitudinal groove in one side thereof, the sides of the tubular form converging toward said groove and, the edge portions of said composite steel sheet being oppositely disposed on each side of the groove forming flat flanges, and downturned perpendicular terminal portions thereon, whereby the two sheets are interlocked, and welds at spaced points in the entrance to the groove for rigidly holding the two sheets interlocked.

4. A laminated tubular section structural member of indefinite length and uniform cross-section for use as a chord member in a large, heavy fabricated structural member, said laminated tubular structural member comprising two superposed hot-rolled steel sheets, the opposed surfaces of which are in contact throughout their entire areas, a plastic adhesive material located between and securely connecting said superposed steel sheets together throughout their areas providing a composite hot-rolled steel sheet, the longitudinal central portion of said composite steel sheet being of tubular form with a longitudinal groove in one side thereof, the sides of the tubular form converging toward said groove and, the edge portions of said composite steel sheet being oppositely disposed on each side of the groove forming flat flanges with downturned perpendicular terminal edge portions whereby the two sheets are interlocked, and welds at spaced points in the entrance to the groove for rigidly holding the two sheets interlocked, said plastic adhesive material connecting said superposed steel sheets together throughout the tubular portion and the flanges and the downturned perpendicular terminal edge portions thereof providing a composite hot-rolled steel tubular section structural member.

5. A laminated tubular section structural member of indefinite length and uniform cross-section for use as a chord member in a large, heavy fabricated structural member, said laminated tubular structural member comprising a plurality of superposed hot-rolled steel sheets, the opposed surfaces of which are in contact throughout their entire areas, the thickness of each of said steel sheets being no greater than .230 inch, the heaviest gauge in the present hot-rolled sheet classification, the combined thickness of said steel sheets being greater than .230 inch, a plastic adhesive material located between and securely connecting said superposed steel sheets together throughout their areas providing a composite hot-rolled steel sheet, the longitudinal central portion of said composite steel sheet being of tubular form with a longitudinal groove in one side thereof, the sides of the tubular form converging toward said groove and, the edge portions of said composite steel sheet being oppositely disposed on each side of the groove forming flat flanges, and downturned perpendicular terminal portions thereon, whereby the two sheets are interlocked, and welds at spaced points in the entrance to the groove for rigidly holding the two sheets interlocked, said plastic adhesive material connecting said superposed steel sheets together throughout the tubular portion and the flanges providing a composite hot-rolled steel tubular section structural member of greater thickness than the heaviest gauge in the present hot-rolled sheet classification.

References Cited in the file of this patent

UNITED STATES PATENTS

| | | |
|---|---|---|
| 659,266 | Stewart | Oct. 6, 1900 |
| 1,778,337 | Pratt | Oct. 14, 1930 |
| 1,784,368 | Loucks | Dec. 9, 1930 |
| 2,237,623 | Ledwinka | Apr. 8, 1941 |
| 2,423,870 | Blessing | July 15, 1947 |
| 2,457,250 | Macomber | Dec. 28, 1948 |
| 2,554,262 | Nagel | May 22, 1951 |
| 2,816,356 | Hobrock | Dec. 17, 1957 |